March 17, 1964 R. W. PALTHE 3,125,694

SIGNAL WAVEFORM GENERATOR EMPLOYING STORAGE CAPACITOR CHARGED AND DISCHARGED THROUGH TRANSISTORS OF OPPOSITE CONDUCTIVITY

Filed Jan. 29, 1962

RICHARD W. PALTHE
INVENTOR.

BY Nathan N. Kallman

ATTORNEY

United States Patent Office 3,125,694

Patented Mar. 17, 1964

3,125,694

SIGNAL WAVEFORM GENERATOR EMPLOYING STORAGE CAPACITOR CHARGED AND DISCHARGED THROUGH TRANSISTORS OF OPPOSITE CONDUCTIVITY

Richard W. Palthe, San Carlos, Calif., assignor to Ampex Corporation, Redwood City, Calif., a corporation of California Filed Jan. 29, 1962, Ser. No. 169,421
8 Claims. (Cl. 307—88.5)

Figure 1:
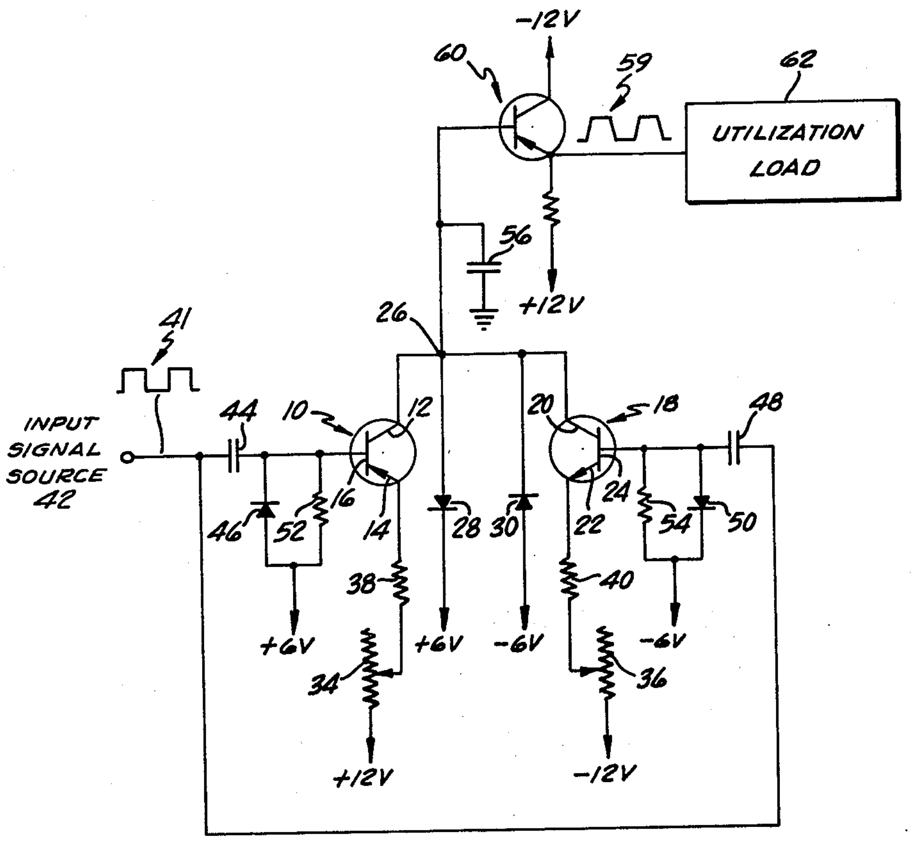

This invention relates to a signal waveform generator and in particular to an improved means for generating trapezoidal waveforms.

Trapezoidal waveforms have various applications in electrical systems, and may be particularly useful for accurate signal switching. One example of such use is described in copending patent application S.N. 97,051, entitled "Magnetic Tape Apparatus," filed in behalf of B. L. Stratton, and assigned to the same assignee. In that application, a pair of trapezoidal signals in antiphase are employed for the purpose of providing "slow switching" between a plurality of information signal processing channels in a magnetic tape apparatus of the rotary head type. The slopes or ramps of the trapezoidal waveform afford an interval during which switching between signal channels may be achieved without any appreciable loss of the processed signal.

In the prior art, phantastron and bootstrap type circuits that utilize vacuum tubes have been employed as trapezoid signal generators. However, it would be preferable in many instances to employ transistor circuits in lieu of vacuum tubes for compactness and economy.

It is also generally desirable that a trapezoidal waveform, which is utilized as a control signal for switching circuits, for example, should have a controlled amplitude, controlled slopes or ramps, and a constant frequency and predetermined phase so that the slopes appear at precise intervals related to the switching interval.

Therefore, it is an object of this invention to provide an improved trapezoidal waveform generator.

It is another object of this invention to provide a transistorized trapezoidal waveform generator providing an output waveform having a controlled slope and amplitude.

According to this invention, a trapezoidal waveform generator comprises a pair of constant current charging devices, such as a pair of transistors of opposite polarity, i.e., a PNP and an NPN transistor. An alternating waveform signal, such as a square wave, is derived from an input signal source and applied to the control electrodes or bases of the transistors through clamping networks. The common electrodes or emitters of the transistors are tied to variable resistances that control the emitter bias current and, therefore, the resultant magnitude of the output current flow from the transistors that varies with input signal variations.

An output signal may be derived from the output electrodes or collectors of the transistors, which are connected at a junction or terminal. A separate "catching" diode is associated with each transistor and these diodes are connected to the collector junction to control the amplitude of the output signal. A capacitor is also connected to the collector junction to pass a substantially linear voltage output in accordance with the collector circuit current.

The size of the capacitor in the collector circuit and the magnitude of the constant charging current serve to determine the slope of the ramps of the trapezoidal output waveform. By means of the "catching" diodes and emitter current injection, the amplitude of the output waveform is determined. To enhance the linearity of the output waveform, an emitter follower serving as a buffer stage may be coupled between the collector circuit and a utilization load.

Figure 2:
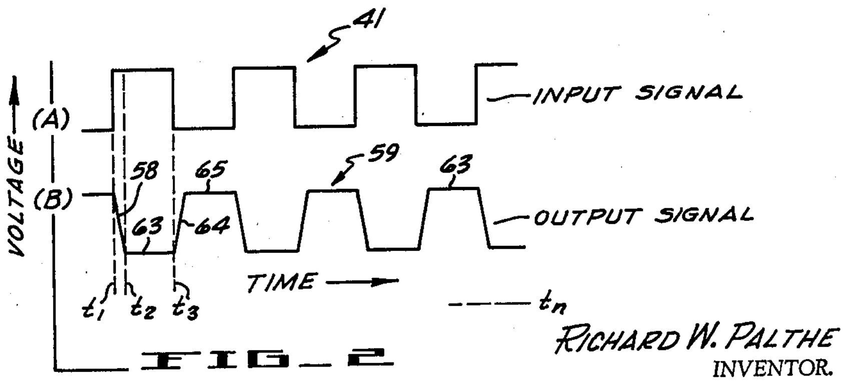

The invention will be described in greater detail with respect to the figures of the drawing, in which:

FIGURE 1 is a schematic circuit diagram, partly in block, of an embodiment of a transistorized trapezoidal generator in accordance with the invention; and FIGURES 2*a* and 2*b* are waveforms showing the relationship between the input and output signals of the generator circuit.

In FIGURE 1, a trapezoidal waveform generator comprises a PNP junction transistor 10 having a collector 12, emitter 14 and base 16; and an NPN transistor 18 having a collector 20, emitter 22 and base 24.

The output electrodes or collectors 12 and 20 are coupled at a junction point 26, to which are connected a pair of "catching" diodes 28 and 30, the anode of diode 28 and the cathode of diode 30 being tied to the junction 26. Also, the cathode of the diode 28 is connected to a source of positive potential while the anode of the diode 30 is coupled to a source of negative potential.

The emitters 14 and 22 are coupled respectively to fixed resistances 38 and 40 and to variable resistors 34 and 36 for varying the emitter current. To supply the emitter bias voltage, the variable resistances 34 and 36 are tied to suitably poled voltage supplies.

An input square wave signal 41, as depicted in FIGURE 2*a*, is derived from a source 42 for application to the input electrodes or bases 16 and 24 of the transistors 10 and 18. Between the source 42 and the bases 16 and 24 are clamping circuits comprising respectively a capacitor 44 and a diode 46, and a capacitor 48 and a diode 50. The diode 46 is coupled in parallel with a resistor 52, and a source of fixed positive potential is connected to the junction of the anode of the diode 46 and the resistor 52. In a similar fashion, the diode 50 associated with the base 24 of the NPN transistor 18 is coupled in parallel with a resistor 54 with a source of fixed negative potential connected to the junction of the cathode of the diode 50 and the resistor 54. These diode clamping circuits coupled to the base of each transistor determine the D.C. voltage at which each of the transistors will conduct.

A capacitor 56 is coupled to the junction 26 and the collector circuit for providing the slope characteristic or ramps 58 of the trapezoidal output signal 59 (shown in FIGURE 2*b*) in conjunction with variations in collector current. The capacitor 56 is located between the junction 26 and a point of reference potential, such as ground. To enhance the linearity of the output waveform 59, a buffer stage or a transistor emitter follower 60 is interposed between the capacitor 56, connected to the collector output circuit, and a utilization load 62.

During the quiescent condition of the inventive circuit, the transistors 10 and 18 conduct substantially equally, and the junction 26 in the collector output circuit is maintained thereby at a fixed voltage, which may be zero potential or ground for example. However, when a square wave signal 41 having a predetermined frequency is supplied by the source 42, the base currents of the transistors 10 and 18 are varied.

Thus, when the input signal 41 becomes most positive, as shown in FIGURE 2*a* at time $t_1$, the bases 16 and 24 of the transistors 10 and 18 become more positive relative to the emitters 14 and 22 respectively. The NPN transistor 18 becomes forward biased and conducting, whereas the PNP transistor 10 becomes reverse biased to a cutoff condition.

The clamping circuit comprising the diode 50 and capacitor 48 clamps the input signal 41 at its positive peak level. The collector current of the NPN transistor 18 that appears at the junction 26 is a function of the signal voltage supplied to the base, the emitter injection current, and the clamping voltage established by the clamping circuit including the capacitor 48 and the diode 50 (a description of emitter current injection may be found in R. B. Hurley's "Junction Transistor Electronics," page 87, published by John Wiley and Sons, Inc., in 1958). In a circuit employing emitter current injection, the collector current is approximately equal to the emitter current and is virtually independent of collector voltage.

As the collector 20 passes current to the junction 26, the capacitor 56 charges linearly in a negative direction toward the emitter voltage and a negative-going ramp 58 is formed. Because the base 24 is maintained at a more positive voltage than the emitter bias voltage, the base-collector junction becomes forward biased and acts as a "catching" diode thereby limiting the collector potential to that of the base voltage. The catching diode 30, which is connected to a negative reference voltage supply, serves to aid the base-collector function in the "catching" process. When the voltage of the capacitor 56 approaches the negative potential of the cathode of the diode 30, any further negative increase in the capacitor voltage is prevented. Thus, for the interval $t_2$—$t_3$, the output signal is maintained at a constant voltage to provide the horizontal portion 63 of the trapezoid waveform.

On the other hand, when the input signal is negative-going, as at time $t_3$ in FIGURE 2*a*, the PNP transistor 10 begins to conduct and the NPN transistor 18 is cutoff. The clamping circuit including the diode 46 and capacitor 44 clamps the incoming signal 41 at its negative peak level. The capacitor 56 charges in a positive direction so that a positive-going ramp 64 of FIGURE 2*b* is developed. The base-collector junction of the transistor 10 and the clamping diode 28 serve to establish the amplitude of the plateau or horizontal portion 65.

Since the current derived from either transistor 10 or 18 is constant, the voltage variations at the capacitor 56 is substantially linear. However, to improve the linearity of the output waveform 59, an emitter follower stage such as transistor 60 having its emitter and collector electrodes tied to sources of fixed potential having suitable polarities is coupled between the capacitor 56 and the utilization load 62. The emitter follower 60 presents a high impedance to the capacitor 56 but is capable of driving succeeding low impedance circuits. The output of the emitter follower 60 is identical to the voltage waveform on capacitor 56, which is a trapezoidal waveform.

By means of the variable resistors 34 and 36, the emitter current of transistors 10 and 18 may be varied. The adjustment of the resistors 34 and 36 thus may be used to vary the slopes of the trapezoid waveform derived at the output, within ±20%, by way of example. The amplitude of the output signal may be set by the bias voltage supplied to the diodes 28 and 30. The value of the capacitor 56 also serves to determine the slope or ramp of the output waveform.

When employed with a magnetic tape apparatus that utilizes a rotary head assembly, the square wave input signal may be derived from a photoelectric cell that senses the position of the head drum. A square wave having a frequency of 244 or 488 cycles per second may be supplied to the trapezoid generator of this invention. The input signal may also be processed in a switching waveform processor to form symmetrical square waves in proper phase relationship to a pair of trapezoid generators, as set forth in U.S. patent application S.N. 137,368, entitled "Magnetic Recording and Reproducing System," filed in behalf of E. Kietz, and assigned to the same assignee.

It is to be understood, however, that the scope of the invention covering a trapezoid waveform generator is not necessarily limited to the particular configuration defined above, and that various combinations and modifications incorporating the basic novel features are considered to be within the concept of the invention. Also, the reference voltages, frequencies and other parameters are not limited only to those values shown. Furthermore, it is to be understood that the trapezoid generator circuit set forth herein may be utilized with other than magnetic tape apparatus, mentioned by way of example, and for any other purpose requiring such a waveform.

What is claimed is:

1. A signal waveform generator for providing an output signal having sloping portions comprising:
   - a pair of transistors of opposite polarity each having base, collector, and emitter electrodes with the collectors being connected at a junction;
   - means for simultaneously applying a square wave signal between the base and emitter electrodes of the transistors to make the transistors conduct alternately;
   - means coupled to the collectors of the transistors to control the amplitude of the output signal;
   - an output circuit including a storage capacitor coupled between the junction of the collectors and a reference potential level;
   - means coupled to the emitters of the transistors to control the slopes of the output signal; and
   - a source of operating potentials coupled to said transistors.

2. A signal waveform generator for providing an output signal having sloping portions comprising:
   - a pair of transistors of opposite polarity each having base, collector, and emitter electrodes with the collectors being connected at a junction;
   - means for simultaneously applying a square wave signal between the base and emitter electrodes of the transistors to make the transistors conduct alternately;
   - unidirectional conducting means coupled to the collectors of the transistors to control the amplitude of the output signal;
   - an output circuit including a storage capacitor coupled between the collectors and a reference potential level;
   - variable resistance means coupled to the emitters of the transistors to control the slopes of the output signal; and
   - a source of operating potential coupled to the transistors, unidirectional coupling means, and variable resistance means.

3. A signal waveform generator for providing an alternating waveform having a predetermined amplitude and sloping portions with a controlled slope comprising:
   - a pair of constant current devices of opposite polarity, said devices having input, common and output electrodes with the output electrodes being connected at a junction;
   - means for applying an alternating waveform input signal between the input and common electrodes of said devices;
   - means for controlling the amplitude of the output voltage waveform connected to the junction of the output electrodes;
   - a storage capacitor coupled between the junction of the output electrodes and a reference potential level;
   - a utilization load coupled in parallel with said capacitor;
   - variable resistance networks connected to the common electrodes of said devices for controlling the slopes of the output signal; and
   - a source of operating potential coupled to the constant current devices, means for controlling the amplitude of the output voltage waveform, and the variable resistance networks.

4. A signal waveform generator for providing an alternating waveform having sloping portions with a controlled slope and predetermined amplitude comprising:
   - a pair of constant current devices of opposite polarity, said devices having input, common, and output electrodes with the output electrodes being connected at a junction;

the input electrodes, and common electrodes of said device being coupled to a source of operating voltages;

means for applying a square waveform signal between the input and common electrodes of said devices;

catching diodes for controlling the amplitude of the output voltage waveform connected between the output electrodes of said devices and the source of operating potential;

a storage capacitor coupled between said output electrodes and a reference potential level;

a utilization load connected in parallel with said capacitor; and variable resistance networks coupled between the common electrodes of said devices and the source of operating potential for controlling the slopes of the output signal.

5. A waveform generator for providing an output signal having sloping portions comprising:

a first electrical conducting device having an input electrode, an output electrode, and a common electrode;

a second electrical conducting device having an input electrode, an output electrode and a common electrode;

said first and second devices being of opposite polarity with said output electrodes being connected at a junction;

means for simultaneously applying an alternating waveform between said input electrodes and said common electrodes;

variable resistance means coupled to said common electrodes;

means for limiting the amplitude of the output voltage waveform derived from said output electrode coupled to said junction;

a fixed storage capacitor coupled to said junction and a point of reference potential;

an output load coupled in parallel with said capacitor; and a source of operating potentials coupled to each of said devices through said variable resistance means and said means for limiting.

6. A waveform generator for providing an output signal having sloping portions comprising:

a first electrical conducting device having an input electrode, an output electrode, and a common electrode;

a second electrical conducting device having an input electrode, an output electrode, and a common electrode;

said first and second devices being of opposite polarity with said output electrodes being connected at a junction;

means for clamping said input electrodes at reference voltages;

means for applying an alternating waveform to said input electrodes;

a variable resistance means coupled to sources of fixed potential for applying voltages to said common electrodes;

catching diode means for limiting the amplitude of the output voltage waveform derived from said output electrode coupled to said junction;

a fixed storage capacitor coupled to said junction and a point of reference potential;

and an output load coupled in parallel with said capacitor.

7. A waveform generator comprising:

a first transistor of the PNP type;

a second transistor of the NPN type, each transistor having a collector, an emitter and a base electrode;

means for applying an alternating waveform signal between the base and emitter electrodes of said transistors;

a separate clamping network coupled between the base of each transistor and a source of bias;

a variable resistance network connected in the emitter circuit of each transistor;

a storage capacitor coupled between a junction point between the collectors of said transistors and a reference potential level;

a pair of diodes coupled to said junction point, the cathode of the diode being associated with the first transistor being tied to a source of positive potential, the anode of the other diode being associated with the second transistor being tied to a source of negative potential;

and a utilization load coupled in parallel with said capacitor for deriving an output waveform.

8. A trapezoidal waveform generator comprising:

a first transistor of the PNP type;

a second transistor of the NPN type, each transistor having a collector, an emitter and a base electrode;

means for applying a square wave signal simultaneously between the base and emitter electrodes of said transistors;

a separate clamping network coupled between the base of each transistor and a source of bias;

a variable resistance network connected in the emitter circuit of each transistor;

a storage capacitor coupled between a junction point between the collectors of said transistors and a reference potential level;

a pair of catching diodes coupled between said junction point and sources of fixed potential of opposite polarity;

a utilization load coupled in parallel with said capacitor for deriving a trapezoidal output waveform; and an emitter follower coupled between said capacitor and said load.

References Cited in the file of this patent

UNITED STATES PATENTS

| | | |
|---|---|---|
| 2,864,961 | Lohman et al. | Dec. 16, 1958 |
| 2,871,378 | Lohman | Jan. 27, 1959 |